United States Patent
Kwon et al.

(10) Patent No.: US 10,006,786 B2
(45) Date of Patent: Jun. 26, 2018

(54) DEVICE AND METHOD FOR CONTROLLING ROTATOR DETECTION SENSOR FOR ROTATOR HAVING RUN-OUT

(71) Applicant: HYUNDAI KEFICO CORPORATION, Gunpo, Gyeonggi-do (KR)

(72) Inventors: Woo-Young Kwon, Gyeonggi-do (KR); Seung-Gyon Jeong, Gyeonggi-do (KR)

(73) Assignee: HYUNDAI KEFICO CORPORATION, Gunpo, Gyeonggi-do (KR)

( * ) Notice: Subject to any disclaimer, the term of this patent is extended or adjusted under 35 U.S.C. 154(b) by 0 days. days.

(21) Appl. No.: 15/360,669

(22) Filed: Nov. 23, 2016

(65) Prior Publication Data
US 2017/0074683 A1    Mar. 16, 2017

Related U.S. Application Data

(63) Continuation of application No. PCT/KR2015/006754, filed on Jul. 1, 2015.

(30) Foreign Application Priority Data

Oct. 7, 2014    (KR) ........................ 10-2014-0134915

(51) Int. Cl.
  *G01B 7/30*     (2006.01)
  *G01D 5/245*    (2006.01)
  *G01D 5/12*     (2006.01)

(52) U.S. Cl.
  CPC ............... *G01D 5/245* (2013.01); *G01D 5/12* (2013.01)

(58) Field of Classification Search
  CPC ................................ G01D 5/245; G01D 5/12
  (Continued)

(56) References Cited

U.S. PATENT DOCUMENTS

| | | | |
|---|---|---|---|
| 6,373,241 B1 | 4/2002 | Weber et al. | |
| 6,969,986 B2 * | 11/2005 | Schmid | G01P 3/489 324/166 |
| 2013/0320970 A1 * | 12/2013 | Foletto | G01D 5/2448 324/251 |

FOREIGN PATENT DOCUMENTS

| | | |
|---|---|---|
| EP | 0589799 A1 | 3/1994 |
| JP | 61-045906 A | 3/1986 |

(Continued)

*Primary Examiner* — Reena Aurora
(74) *Attorney, Agent, or Firm* — Mintz Levin Cohn Ferris Glovsky and Popeo, P.C.; Kongsik Kim; Colleen H. Witherell

(57) ABSTRACT

A device and method for controlling a rotator detection sensor for a rotator having run-out is provided. The method for controlling a rotator detection sensor for a rotator having run-out includes recognizing, by a pattern recognition unit, a pattern having peaks based on a magnetic flux density of the rotator measured for a preset time interval, recognizing, by the pattern recognition unit, the number of protrusions of the rotator based on the pattern having the peaks of the magnetic flux density, and setting, by a switching level setting unit, switching levels for the magnetic flux density based on the number of the protrusions. The magnetic flux density has a plurality of peaks that correspond to the number of protrusions of the rotator. The switching levels for the magnetic flux density are each set at a point that corresponds to a preset percentage at each of the peaks.

19 Claims, 4 Drawing Sheets

(58) Field of Classification Search
USPC .................................................. 324/207.25
See application file for complete search history.

(56) References Cited

FOREIGN PATENT DOCUMENTS

| | | | |
|---|---|---|---|
| JP | 07-019004 Y2 | 1/1995 |
| JP | 11-218405 A | 8/1999 |
| JP | 2012-202791 A | 10/2012 |
| KR | 10-2012-0109367 A | 10/2012 |

* cited by examiner

DEVICE AND METHOD FOR CONTROLLING ROTATOR DETECTION SENSOR FOR ROTATOR HAVING RUN-OUT

CROSS-REFERENCE TO RELATED APPLICATIONS

This is a continuation application of International Application No. PCT/KR2015/006754 filed Jul. 1, 2015, which claims priority, under 35 U.S.C. § 119, to Korean Application No. 10-2014-0134915 filed Oct. 7, 2014. The applications are incorporated herein by reference in its entirety.

BACKGROUND

Field of the Disclosure

The present disclosure relates to a device and method for controlling a rotator detection sensor for a rotator having run-out, and more particularly to a device and method for controlling a rotator detection sensor to maintain the stability and precision of the sensor.

Description of the Related Art

Typically, a conventional rotator detection sensor is implemented based on the Hall effect or the Magneto-Resistive (MR) effect. In particular, the conventional rotator detection sensor is configured to enable an on or off operation to be performed based on the comparison of a single reference value with a magnetic flux density, which changes based on the tooth form or polarity of a rotator when the rotator rotates. For example the reference value may be experimentally determined in consideration of the air gap between the rotator and the detection sensor, the speed of the rotator, and the like, to improve precision. Additionally, the sensor is configured to operate based on an arbitrarily input reference value for a rapid response after the rotator beings to rotate (a function of True Power On: TPO). The reference value may be set to accomplish high stability and low precision in consideration of the magnetic flux density, which changes based on the air gap.

For example, when a single reference value is used and the rotator has run-out and thus the magnetic flux density is unstable the following operational issues may occur. When the single reference value is high, the stability of a signal may be decreased. When the single reference value is low, the precision of the signal may be decreased.

The matters disclosed in this section are merely for enhancement of understanding of the general background of the disclosure and should not be taken as an acknowledgment or any form of suggestion that the matters form the related art already known to a person skilled in the art.

SUMMARY

A method for controlling a rotator detection sensor for a rotator having run-out may include recognizing, by a pattern recognition unit, a pattern having peaks based on a magnetic flux density of the rotator, that may be measured for a preset time interval, recognizing, by the pattern recognition unit, a number of protrusions of the rotator based on the pattern having the peaks of the magnetic flux density; and setting, by a switching level setting unit, switching levels for the magnetic flux density based on the number of the protrusions. The magnetic flux density may have a number of peaks that correspond to the number of the protrusions of the rotator. The setting of the switching levels may be configured to enable each of the switching levels to be set at a point that corresponds to a preset percentage at each of the peaks.

The method may further include outputting, by a signal generation unit, a sensor signal for the peaks based on the switching levels. The sensor signal may include a high state and a low state. The outputting the sensor signal may be configured to determine that when the sensor signal is in a high state, the sensor signal in the high state may be switched to the sensor signal in a low state when the magnetic flux density reaches the switching levels and when the sensor signal is in a low state, the sensor signal in the low state may be switched to the sensor signal in a high state when the magnetic flux density reaches the switching levels.

In some exemplary embodiments the method may further include determining, by a determination unit, when the number of the protrusions is correctly recognized. The determining when the number of the protrusions is correctly recognized may be configured to compare information about a number of the protrusions previously stored in a storage unit with a number of the protrusions recognized in recognizing the number of the protrusions of the rotator. The determining when the number of the protrusions is correctly recognized may be configured to compare patterns having peaks with each other, which are acquired in recognizing the pattern having the peaks.

The method may further include recognizing, by the switching level setting unit, a lowest switching level value, which is a lowest switching level among the set switching levels. The method may further include performing, by a determination unit, a comparison to check when the lowest switching level value is identical to a True Power On (TPO) switching level. The TPO switching level may be an initial switching level that may be applied to the magnetic density flux before setting the switching levels. Further, in performing the comparison, when the lowest switching level value is different from the TPO switching level, the TPO switching level may be updated based on the lowest switching level value. In particular, the method may further include compensating, by a compensation unit, for a change in the magnetic flux density that occurs in response to an adjustment in temperature.

A device configured to control a rotator detection sensor for a rotator having run-out according to the present disclosure may include a pattern recognition unit configured to recognize a pattern having peaks based on a magnetic flux density of the rotator measured for a preset time interval and configured to recognize a number of protrusions of the rotator based on the pattern having the peaks of the magnetic flux density and a switching level setting unit configured to set switching levels for the magnetic flux density based on the number of the protrusions. The magnetic flux density may have a number of peaks that correspond to the number of the protrusions of the rotator and the switching level setting unit may set each of the switching levels at a point that corresponds to a preset percentage at each of the peaks.

The device may further include a signal generation unit configured to output a sensor signal for the peaks based on the switching levels. The signal generation unit may be configured to output the sensor signal when the sensor signal is in a high state, the sensor signal in the high state may be switched to the sensor signal in a low state when the magnetic flux density reaches the switching levels. When the sensor signal is in a low state, the sensor signal in the low state may be switched to the sensor signal in a high state when the magnetic flux density reaches the switching levels.

The device may further include a determination unit configured to determine when the number of the protrusions is correctly sensed. The determination unit may compare information about a number of the protrusions previously stored in a storage unit with a number of the protrusions recognized by the pattern recognition unit and may thereby determine whether the number of the protrusions is correctly recognized. In particular, the determination unit may compare patterns that have the peaks with each other, which are acquired for a preset time interval by the pattern recognition unit and may thereby determine when the number of the protrusions are correctly recognized.

The switching level setting unit may be configured to recognize a lowest switching level value, which is a lowest switching level among the set switching levels. The determination unit may be configured to perform a comparison to determine when the lowest switching level value is identical to a True Power On (TPO) switching level and may update the TPO switching level based on the lowest switching level value when the lowest switching level value is different from the TPO switching level. The device may further include a compensation unit configured to compensate for a change in the magnetic flux density that occurs in response to a change in temperature.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
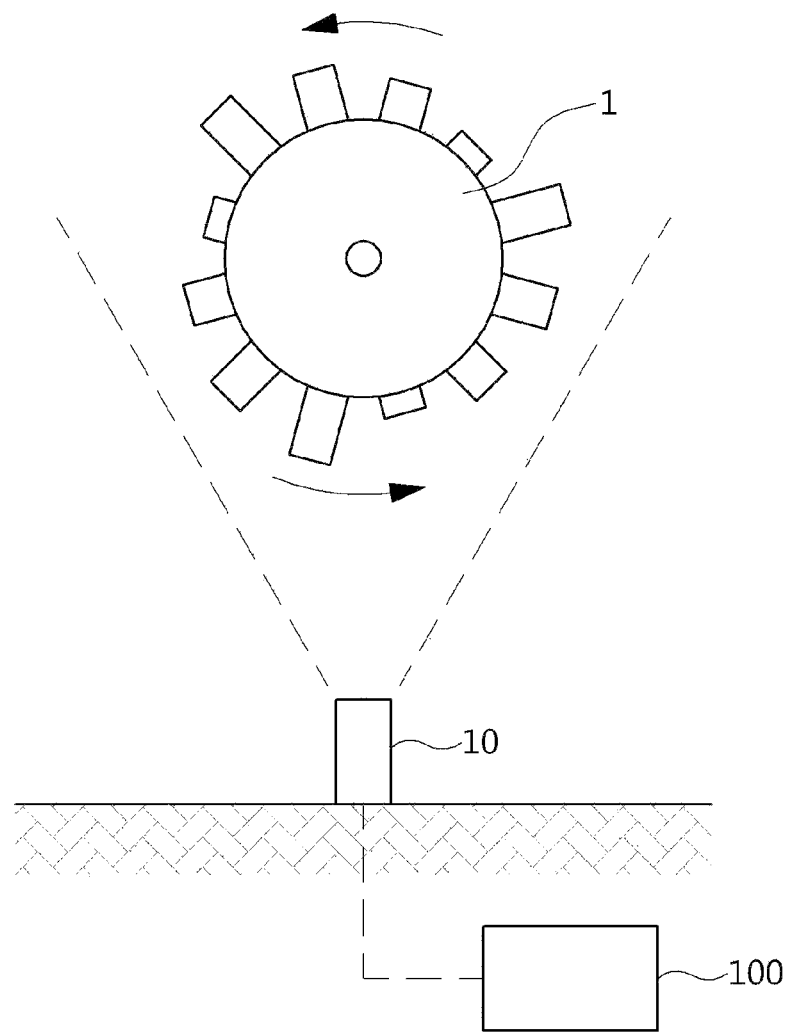
FIG. 1 is an exemplary view for describing the relationship between a rotator, a sensor, and a device for controlling the rotator detection sensor according to an exemplary embodiment of the present disclosure.

The present disclosure will be described in detail below with reference to the accompanying drawings Repeated descriptions and descriptions of known functions and configurations which have been deemed to make the gist of the present disclosure unnecessarily obscure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated in order to make the description clearer.

Advantages and features of the present disclosure and methods for achieving the same will be clearly understood with reference to the following detailed description of embodiments in conjunction with the accompanying drawings. However, the present disclosure is not limited to the embodiments disclosed herein, but may be implemented in various different forms. The embodiments are merely given to make the disclosure of the present disclosure complete and to completely instruct the scope of the disclosure to those skilled in the art, and the present disclosure should be defined by the scope of the claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Hereinafter, a device 100 for controlling a rotator detection sensor according to an exemplary embodiment of the present disclosure will be described. FIG. 1 is an exemplary view for describing the relationship between a rotator, a sensor, and a device configured to control the rotator detection sensor. In particular, the rotator 1 may have multiple protrusions. For example, the rotator 1 may be a gear having multiple gear teeth. The sensor 10 may be configured to sense the protrusions of the rotator when the rotator 1 rotates and may be configured to deliver the sensed information to the device 100 for controlling the rotator detection sensor. Further the device 100 for controlling the rotator detection sensor may be configured to control the sensor 10. The device may be configured to determine the pattern of the information collected by the sensor 10, sets the number of switching levels based on the recognized pattern, and thereby outputs a sensor signal for peaks.

Figure 2:
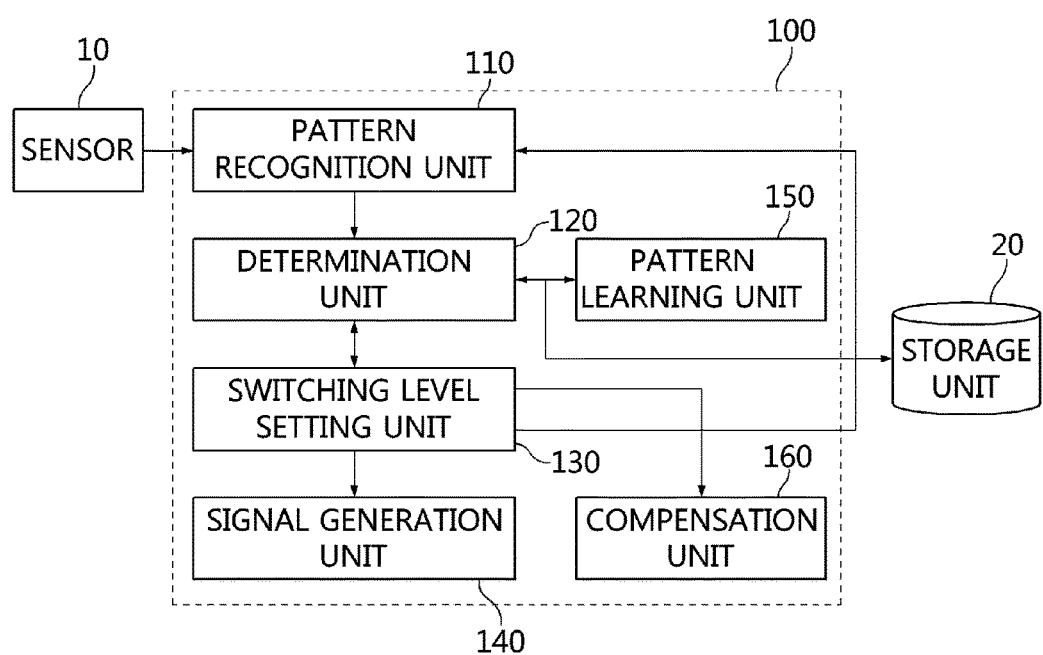
FIG. 2 is an exemplary block diagram of a device for controlling a rotator detection sensor according to an exemplary embodiment of the present disclosure.

FIG. 2 is an exemplary block diagram of a device 100 configured to control a rotator detection sensor based on an embodiment of the present disclosure. For example, the sensor 10 and the device 100 for controlling the rotator detection sensor may be electrically or mechanically connected with each other. The device 100 for controlling the rotator detection sensor according to an exemplary embodiment may be configured to determine a reference value (hereinafter, referral to as a "switching level") for the magnetic flux density, that may be adjusted based on the tooth form or polarity of the rotator, to improve the accuracy of the detection by the rotator detection sensor, and outputs a sensor signal with high accuracy and high precision based on the switching level. For example, the rotator indicates a rotator having run-out. In other words, the device 100 for controlling the rotator detection sensor may be configured to include a pattern recognition unit 110, a determination unit 120, a switching level setting unit 130, a signal generation unit 140 and a pattern learning unit 150. Hereinafter, each of the components included in the device 100 for controlling the rotator detection sensor will be described.

The pattern recognition unit 110 may be configured to recognize a pattern having peaks based on the magnetic flux density of the rotator, which is measured for a preset time interval, and recognizes the number of protrusions of the rotator based on the pattern having the peaks of the magnetic flux density. As described above, the rotator may have run-out. In particular, the rotator may have multiple protrusions and these protrusions may have different heights. For example, when the rotator is a vehicle gear, the gear may have multiple gear teeth and these gear teeth may be regarded as an embodiment of the above-mentioned protrusions. In other words, when a rotator is sensed based on the fixed sensor 10, a magnetic flux density having a varying amplitude may be output due to the shape of the protrusions that may have different heights. For example, when the distance between the sensor 10 and the protrusion is reduced, (e.g., as the height of the protrusion are higher), magnetic flux density having a higher amplitude may be output. In other words, the magnetic flux density sensed by the sensor 10 exhibits a rising curve whenever the sensor 10 senses each of the protrusions, but exhibits a falling curve when the protrusion pulls away from the sensor.

The pattern recognition unit 110 may receive information about the above-described magnetic flux density and recognize the pattern having peaks. The pattern recognition unit 110 may recognize the number of protrusions based on the pattern of the magnetic flux density having peaks, based on the number of peak points included in the magnetic flux density. For example, when a rotator has three protrusions, the magnetic flux density sensed by the sensor 10 may exhibit three peaks and three troughs for each rotation. In particular, the three peaks, which are the highest peak, the second-highest peak and the third-highest peak may have different values based on the different heights of the respective protrusions. Accordingly, the pattern recognition unit 110 may determine the number of protrusions based on the number of peaks.

The determination unit 120 may be configured to determine whether the protrusions included in the rotator are correctly recognized. The determination may be performed based on one of two methods. In an exemplary embodiment, the determination by the determination unit 120 may be implemented by comparing information about the number of protrusions recognized by the pattern recognition unit 110 with the number of protrusions input by a user or stored in the storage unit 20. Additionally, in another exemplary embodiment, the determination unit 120 may be configured to determine whether the number of protrusions of the rotator is correct by comparing patterns, which have peaks and are detected by the pattern recognition unit 110, with each other for a preset time interval in conjunction with the pattern learning unit 150. As described above, the process of confirming the number of protrusions, performed by the determination unit 120, may be largely categorized into two methods. In the above description, the determination process may be described as being performed based on one method, but this is an example, and it is possible to perform both methods depending on user settings.

The switching level setting unit 130 may be configured to set the number of reference values. In other words, the number of switching levels, based on the number of protrusions and sets switching levels based on the number of switching levels may be set. Specifically, the switching level setting unit 130 may be configured to set a switching level at a point that corresponds to a preset percentage at each of the peaks. As described above, when the rotator has three protrusions, the magnetic flux density, sensed by the sensor 10, exhibits three peaks and three troughs. The three peaks, which are the highest peak, the second-highest peak and the third-highest peak may have different values based on the different heights of the respective protrusions.

The switching level setting unit 130 may be configured to set the switching level for each of the highest peak, the second-highest peak and the third-highest peak. In other words, the number of switching levels set by the switching level setting unit 130 may be three, which is the number of peaks and the number of protrusions. The switching level may be set at a point that corresponds to a preset percentage at each of the peaks. For example, the switching level may be set at the point that corresponds to about 70% of each of the peaks, but the value is not limited thereto. Also, the description thereabout will be made later with reference to FIG. 3, and thus an additional description is omitted.

The signal generation unit 140 may be configured to output a sensor signal for the peaks based on the switching levels set by the switching level setting unit 130. In other words, the signal generation unit 140 may output an accurate sensor signal based on the switching levels that may be set to have a different value for each of the peaks. For example, the sensor signal may include a high state and a low state. In other words, when the previously output sensor signal is in a high state, the signal generation unit 140 may be configured to output a sensor signal by switching the sensor signal in the high state to a sensor signal in a low state when the magnetic flux density reaches a switching level. Similarly, when the preceding sensor signal is in a low state, the signal generation unit 140 may be configured to output a sensor signal by switching the sensor signal in the low state to a sensor signal in a high state when the magnetic flux density reaches a switching level.

The switching level setting unit 130 may further recognize the lowest switching level value, among the set switching levels. For example, the reason why the lowest switching level value is recognized is as follows. Generally, when a sensor for detecting a rotator is applied to a vehicle, for example, a sensor for detecting a gear, even if a switching level is set through the above-mentioned process, information about the switching level may be lost when the ignition of the vehicle is turned off and then turned on. Accordingly, the storage unit of the vehicle stores a True Power On (TPO) switching level. The TPO switching level may be used as an initial value for the switching level when the ignition of the vehicle is turned on. However, when a high initial value is set, the magnetic flux density for a protrusion having a low height may be inaccurately sensed. Therefore, the device 100 for controlling a rotator detection sensor according to an exemplary embodiment recognizes the lowest switching level value and applies the lowest switching level value as the initial value for the switching level, namely, the TPO switching level, whereby the protrusions may be correctly sensed even when the vehicle is started.

For example, when a gear of a vehicle has three gear teeth, the three gear teeth have different heights, the first gear tooth is assumed to have the highest height, and the third gear tooth is assumed to have the lowest height. The rotator detection sensor installed in the vehicle may be configured to sense the magnetic flux density for the gear that rotates after the vehicle is started, and may be configured to output a sensor signal based on the magnetic flux density. As described above, before the switching level for each of the peaks is set, the sensor signal based on the TPO switching level may be output. Since the TPO switching level may be set based on the gear tooth having the lowest height, among the gear teeth based on the third gear tooth, a correct sensor signal may be output regardless of the order in which the gear teeth are sensed.

In other words, the determination unit 120 may be configured to compare the lowest switching level value, recognized by the switching level setting unit 130, with the TPO switching level. When it is determined by the determination unit 120 that the lowest switching level value is the same as the TPO switching level, the current system may be maintained. The determination unit 120 may be configured to update the TPO switching level based on the lowest switching level value. For example, the TPO switching level may be stored in the storage unit 20, for example, in the Electrically Erasable Programmable Read-Only Memory (EEPROM). In other words, the device 100 for controlling the rotator detection sensor according to an exemplary embodiment may apply an adaptive TPO level. A compensation unit 160 may be configured to compensate for a change in magnetic flux density that occurs in response to a change in temperature. Accordingly, stability of the above-described functions, such as pattern recognition, the application of switching levels, updating of a TPO switching level and the like, may be provided.

Figure 3:
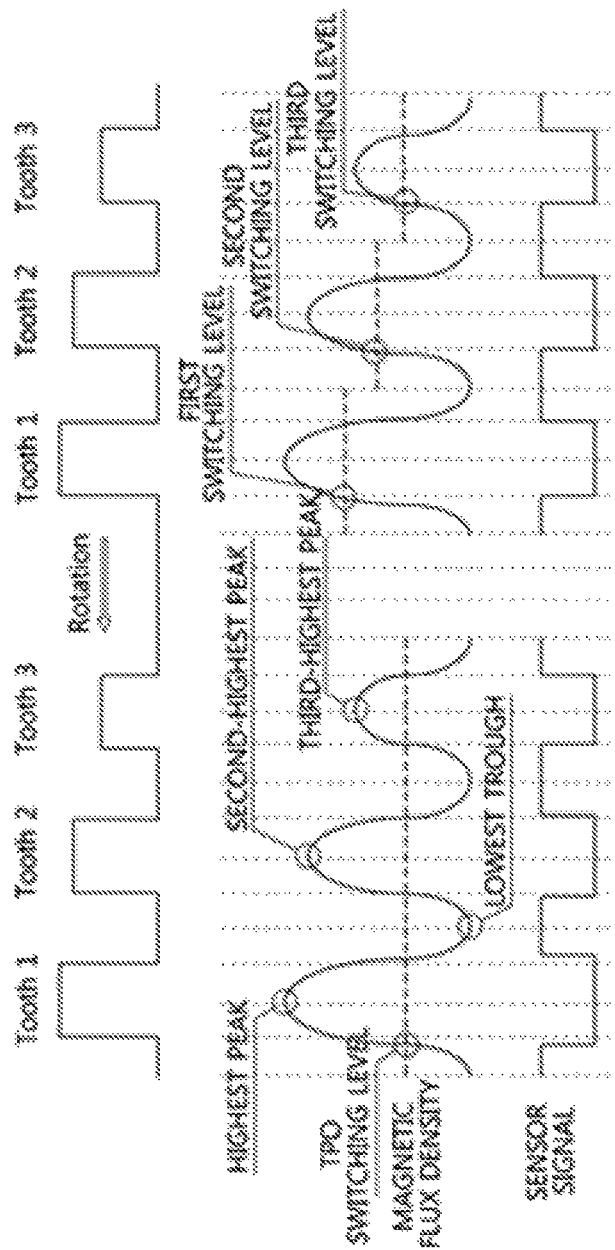
FIG. 3 is an exemplary graph for describing a method for controlling a rotator detection sensor according to an exemplary embodiment of the present disclosure.

FIG. 3 is an exemplary graph for describing a method for controlling a rotator detection sensor according to an exemplary embodiment. As in the embodiment described with reference to FIG. 2, a rotator has three protrusions in the example of FIG. 3. For example, the number of protrusions is limited in order to help the understanding of the specification. However, even if a different number of protrusions are provided, the device and method for controlling the rotator detection sensor according to the present disclosure may correctly sense the protrusions. As described above, it is assumed that a rotator has three protrusions and that the protrusions have different heights. An example of the magnetic flux density of the rotator, that may be configured to be sensed by a sensor, are shown in FIG. 3. In the method for controlling a rotator detection sensor according to an exemplary embodiment, first, a pattern having peaks may be recognized based on the magnetic density flux of the rotator. In other words, as illustrated in FIG. 3, when the rotator has three protrusions, three peaks (e.g., the highest peak, the second-highest peak and the third-highest peak) may exist. When the rotator has four protrusions, there may be four peaks. Accordingly, in the method for controlling a rotator detection sensor, the number of protrusions may be recognized based on the number of peaks.

Then, after the determination unit is configured to determine when the recognized number of protrusions is correct, the process of setting switching levels, the number of which corresponds to the number of protrusions may be performed.

As described above, setting the switching levels may be configured to set each of the switching levels at a point that corresponds to a preset percentage based on each of the peaks. In this example, the preset percentage may be described as being set to about 70%, but this is an example, and the value is not limited to the percentage. When the process of setting the switching levels is completed, the first switching level, the second switching level and the third switching level may be set, as shown in the right side of the graph showing the magnetic flux density in FIG. 3. As described above, because these switching levels are set to different values to match the respective peaks, the sensor signal may be accurately output, as shown in the lower part of FIG. 3.

Figure 4:
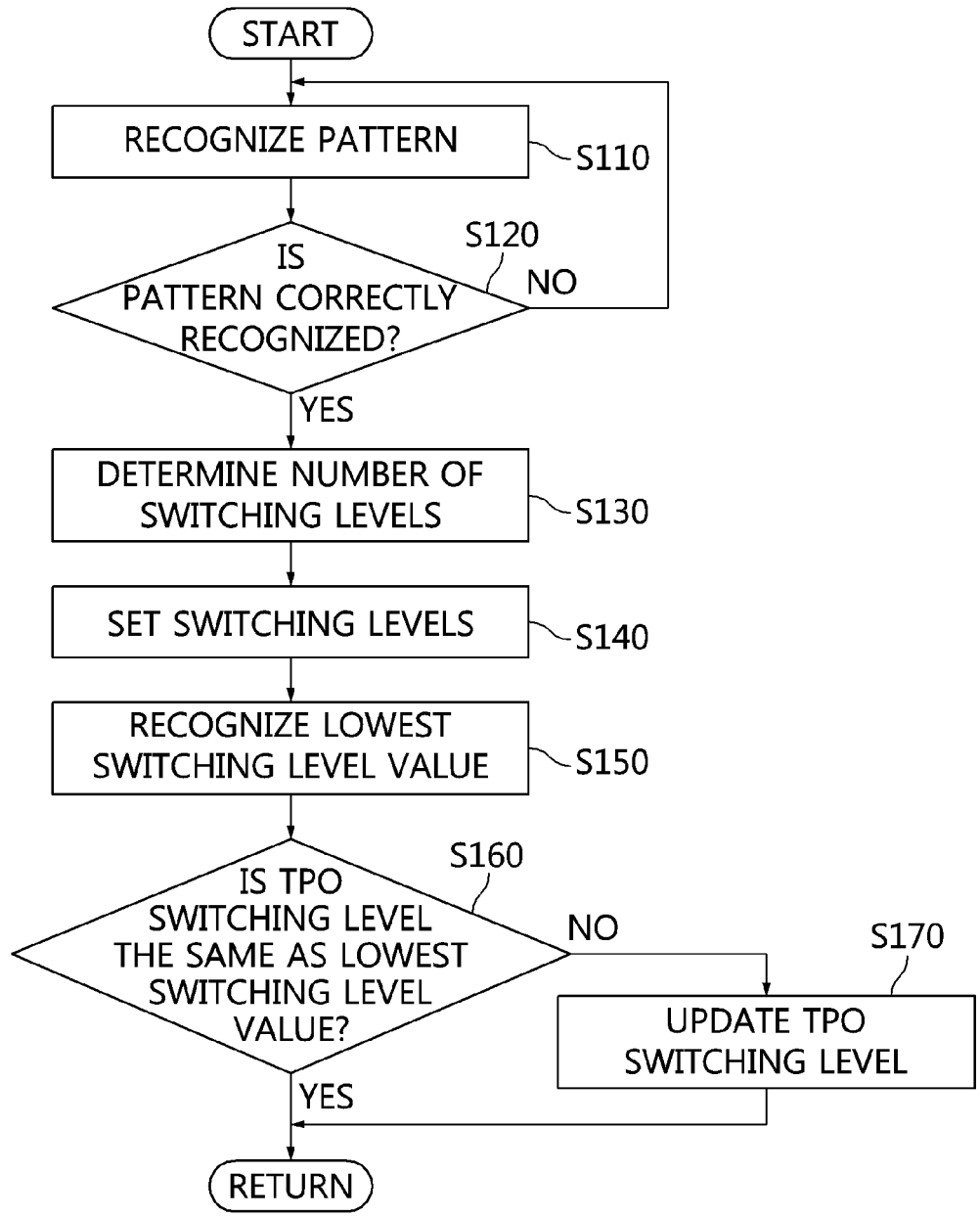
FIG. 4 is an exemplary flowchart of a method for controlling a rotator detection sensor according to an exemplary embodiment of the present disclosure.

FIG. 4 is an exemplary flowchart of a method for controlling a rotator detection sensor according to an exemplary embodiment. The method for controlling a rotator detection sensor according to an exemplary embodiment may correctly set switching levels for the magnetic flux density, which changes based on the tooth form or polarity of the rotator, and may be configured to output a sensor signal having high accuracy and high precision based on the switching levels. The method for controlling a rotator detection sensor according to an exemplary embodiment will be described below. Also, repeated descriptions, which have been made with reference to FIG. 2 and FIG. 3, will be omitted.

First, a pattern recognition unit recognizes a pattern having peaks based on the magnetic flux density of the rotator, that may be measured for a preset time interval, is performed (S110). Also, at the step of recognizing the pattern having the peaks, the process of recognizing the number of protrusions of the rotator based on the recognized pattern having the peaks of the magnetic flux density may be further performed (S110).

Then, the step (S120), in which a determination unit is configured to determine whether the number of protrusions of the rotator was correctly recognized, may be performed. As described above, the determination process performed at the determination step (S120) may be largely categorized into two methods. The first method may be configured to provide information about the number of protrusions, which has been stored in the storage unit in advance in order to determine (S120) whether the number of protrusions of the rotator is correctly recognized, and may be compared with the number of protrusions recognized at the step (S110) of recognizing the pattern having the peaks based on the magnetic flux density of the rotator.

The second method may be configured to compare the patterns having the peaks, acquired for a preset time interval through the step (S110) of recognizing the pattern having the peaks with each other in order to determine (S120) whether the number of protrusions of the rotator is correctly recognized. When it is determined through the determination process that the pattern having the peaks is correctly sensed, control is delivered to the step (S130) configured to determine the number of switching levels based on the number of protrusions. Further, when it is determined that the pattern having the peaks is not correctly sensed, control may be delivered to the step (S110) of recognizing a pattern having peaks based on the magnetic flux density of the rotator, which may be measured for a preset time interval, whereby the above-mentioned processes are repeated.

The step (S130) of determining the number of switching levels based on the number of protrusions may be performed by a switching level setting unit. As described above, in the method for controlling a rotator detection sensor according to an exemplary embodiment, a different switching level may be applied to each of the peaks in consideration of the fact that the peaks have different heights because the corresponding protrusions having different heights. In other words, because different switching levels may be applied to the respective peaks, the process of determining the number of switching levels may be performed through the step (S130) of determining the number of switching levels based on the number of protrusions.

Subsequently, the step (S140) of setting switching levels for the magnetic flux density based on the number of switching levels, which is set at the step (S130) configured to determine the number of switching levels based on the number of protrusions may be performed. Specifically, the step (S140) of setting switching levels for the magnetic flux density according to the number of switching levels may be configured to set each of the switching levels at a point that corresponds to a preset percentage at each of the peaks. Since the step of setting switching levels has been described in detail with reference to FIG. 2 and FIG. 3, an additional description thereabout will be omitted.

Subsequently, the step in which a signal generation unit is configured to output a sensor signal for the peaks based on the switching levels may be performed. For example, the step of outputting the sensor signal is not limited to being performed after the step (S140) of setting switching levels for the magnetic flux density according to the number of switching levels. In other words, the step of outputting the sensor signal is not limited to being performed after a specific step. As described above, the sensor signal may include high and low states. In other words, when a previous sensor signal is in a high state, when the magnetic flux density reaches a switching level, the sensor signal may be output by switching the sensor signal in the high state to the sensor signal in a low state. Similarly, when the previous sensor signal is in a low state, when the magnetic flux density reaches a switching level, the sensor signal may be output by switching the signal in the low state to the signal in a high state.

Subsequently, the step (S150), in which the switching level setting unit may be configured to recognize the lowest switching level value, among the set switching levels, may be performed. The lowest switching level value may be considered through the step (S150) of recognizing the lowest switching level value, among the switching levels. As described above, generally, when a sensor configured to detect a rotator applied is to a vehicle, a sensor for detecting a gear, even if a switching level is set through the above-mentioned process, information about the switching level may be lost when the ignition of the vehicle is turned off and then turned back on. Accordingly, the storage unit of the vehicle may be configured to store a True Power On (TPO) switching level. The TPO switching level may be used as the initial value for the switching level when the ignition of the vehicle is turned on. However, when a high initial value is set, the magnetic flux density for a protrusion having a low height may not be correctly sensed. Therefore, the device 100 for controlling a rotator detection sensor according to an exemplary embodiment may be configured to recognize the lowest switching level value and applies the lowest switching level value to the initial value for the switching level, namely, the TPO switching level, whereby the protrusions may be correctly sensed even when the vehicle is started.

Accordingly, after the lowest switching level value is recognized, the step (S160) of determining whether the TPO switching level is the same as the lowest switching level value may be performed. When the TPO switching level is the same as the lowest switching level value, control may be delivered to the step (S110) of recognizing the pattern having peaks based on the magnetic flux density of the rotator that may be measured for a preset time interval, whereby the above-mentioned processes may be repeated. Furthermore when, the TPO switching level is different from the lowest switching level value, control may be delivered to the step (S170) of updating the TPO switching level based on the lowest switching level value. Then, the control may be delivered to the step (S110) of recognizing the pattern having the peaks based on the magnetic flux density of the rotator, which may be measured for a preset time interval, whereby the above-mentioned processes are repeated.

Additionally, although not illustrated in the drawing, the step of compensating for a change in magnetic flux density that occurs in response to a change in temperature may be further performed. Through this compensation process, the stability of the above steps may be further improved.

According to the device and method for controlling a rotator detection sensor of the present disclosure, there is an effect of improving the precision and stability of a sensor configured to detect a rotator having run-out. Additionally, based on the device and method for controlling a rotator detection sensor of the present disclosure, since a rotator detection sensor uses different switching levels when detecting the rotator, the rotator detection capability may be improved. Accordingly, the run-out of the rotator may be easily processed, thus reducing the expense for producing the rotator. According to the device and method for controlling a rotator detection sensor since an adaptive True Power On (TPO) level is applied, the precision and stability of the sensor when the rotator starts to rotate may be improved.

As described above, exemplary embodiments have been disclosed in the drawings and the specification. Although specific terms have been used in the present specification, these are merely intended to describe the present disclosure, and are not intended to limit the meanings thereof or the scope of the present disclosure described in the accompanying claims. Therefore, those skilled in the art will appreciate that various modifications and other equivalent embodiments are possible from the exemplary embodiments. Therefore, the technical scope of the present disclosure should be defined based on the technical spirit of the claims.

The invention claimed is:

1. A method for controlling a rotator detection sensor for a rotator having run-out, comprising:
   recognizing, by a pattern recognition unit, a pattern having peaks based on a magnetic flux density of the rotator, which is measured for a preset time interval;
   recognizing, by the pattern recognition unit, a number of protrusions of the rotator based on the pattern having the peaks of the magnetic flux density; and
   setting, by a switching level setting unit, switching levels for the magnetic flux density based on the number of the protrusions,
   wherein the magnetic flux density has a number of peaks that correspond to the number of the protrusions of the rotator, and
   wherein the switch level sensing unit setting the switching levels is configured to set each of the switching levels at a point that corresponds to a preset percentage at each of the peaks.

2. The method of claim 1, further comprising:
   outputting, by a signal generation unit, a sensor signal for the peaks based on the switching levels, wherein the sensor signal includes a high state and a low state.

3. The method of claim 2, wherein the outputting the sensor signal when the sensor signal is in a high state, the sensor signal in the high state is switched to the sensor signal in a low state when the magnetic flux density reaches the switching levels and when the sensor signal is in a low state, the sensor signal in the low state is switched to the sensor signal in a high state when the magnetic flux density reaches the switching levels.

4. The method of claim 1, further comprising: determining, by a determination unit, whether the number of the protrusions recognized is correct.

5. The method of claim 4, wherein the determining whether the number of the protrusions is correctly recognized is configured to compare information about a number of the protrusions previously stored in a storage unit with a number of the protrusions recognized in recognizing the number of the protrusions of the rotator.

6. The method of claim 4, wherein the determining whether the number of the protrusions is correctly recognized is configured to compare patterns having peaks with each other, which are acquired in recognizing the pattern having the peaks.

7. The method of claim 1, further comprising: recognizing, by the switching level setting unit configured to determine a lowest switching level value, which is a lowest switching level among the set switching levels.

8. The method of claim 7, further comprising:
performing, by a determination unit, a comparison to determine whether the lowest switching level value is identical to a True Power On (TPO) switching level,
wherein the TPO switching level is an initial switching level applied to the magnetic density flux.

9. The method of claim 8, wherein in performing the comparison, when the lowest switching level value is different from the TPO switching level, the TPO switching level is updated based on the lowest switching level value.

10. The method of claim 1, further comprising: compensating, by a compensation unit configured to determine a change in the magnetic flux density that occurs in response to a change in temperature.

11. A device for controlling a rotator detection sensor for a rotator having run-out, comprising:
a pattern recognition unit configured to recognize a pattern having peaks based on a magnetic flux density of the rotator, which is measured for a preset time interval, and configured to recognize a number of protrusions of the rotator based on the pattern having the peaks of the magnetic flux density; and
a switching level setting unit configured to set switching levels for the magnetic flux density based on the number of the protrusions,
wherein the magnetic flux density has a plurality of peaks that correspond to the number of the protrusions of the rotator, and
wherein the switching level setting unit determines each of the switching levels at a point that corresponds to a preset percentage at each of the peaks.

12. The device of claim 11, further comprising: a signal generation unit for configured to output a sensor signal for the peaks based on the switching levels,
wherein the sensor signal includes a high state and a low state.

13. The device of claim 12, wherein the signal generation unit outputs the sensor signal and when the sensor signal is in a high state, the sensor signal in the high state is switched to the sensor signal in a low state when the magnetic flux density reaches the switching levels and when the sensor signal is in a low state, the sensor signal in the low state is switched to the sensor signal in a high state when the magnetic flux density reaches the switching levels.

14. The device of claim 11, further comprising: a determination unit for determining whether the number of the protrusions sensed is correct.

15. The device of claim 14, wherein the determination unit is configured to compare information about a number of the protrusions previously stored in a storage unit with a number of the protrusions recognized by the pattern recognition unit, and thereby determines whether the number of the protrusions recognized is correct.

16. The device of claim 14, wherein the determination unit is configured to compare patterns with the plurality of peaks with each other, which are acquired for a preset time interval by the pattern recognition unit, and configured to determine whether the number of the protrusions recognized is correct.

17. The device of claim 11, wherein the switching level setting unit recognizes a lowest switching level value, which is a lowest switching level among the set switching levels.

18. The device of claim 17, wherein a determination unit is configured to perform a comparison to determine whether the lowest switching level value is identical to a True Power On (TPO) switching level, and configured to update the TPO switching level based on the lowest switching level value when the lowest switching level value is different from the TPO switching level.

19. The device of claim 11, further comprising: a compensation unit for compensating for a change in the magnetic flux density that occurs in response to a change in temperature.

* * * * *